United States Patent [19]

Burger et al.

[11] Patent Number: 4,619,271
[45] Date of Patent: Oct. 28, 1986

[54] ELECTRONIC THERMOMETER WITH PROBE ISOLATION CHAMBER

[75] Inventors: Laurie J. Burger, North Branford; Joel N. Helfer, Cheshire; Donald E. Protzmann, Litchfield; Robert F. Uhl, Cheshire, all of Conn.

[73] Assignee: Chesebrough-Pond's, Inc., Greenwich, Conn.

[21] Appl. No.: 681,308

[22] Filed: Dec. 13, 1984

[51] Int. Cl.⁴ .............................................. A61B 5/00
[52] U.S. Cl. .................................. 128/736; 374/170; 200/153 T
[58] Field of Search ............... 128/736; 374/169, 170; 324/79 D; 200/153 T, 302.1, 61.58, 52 R, 81 H

[56] References Cited

U.S. PATENT DOCUMENTS

| | | | |
|---|---|---|---|
| 2,824,183 | 2/1958 | Marasco et al. | 200/302.1 |
| 3,785,207 | 1/1974 | Brzezinski | 374/169 |
| 3,822,598 | 7/1974 | Brothers et al. | 374/169 |
| 3,834,238 | 9/1974 | Mueller et al. | 374/170 |
| 3,895,198 | 7/1975 | Piber | 200/153 T |
| 3,903,744 | 9/1975 | Cone | 374/170 |
| 4,007,832 | 2/1977 | Paull et al. | 374/170 |
| 4,121,574 | 10/1978 | Lester | 128/736 |
| 4,455,096 | 6/1984 | Brandstedt | 374/170 |
| 4,487,208 | 12/1984 | Kamers | 374/170 |

Primary Examiner—Edward M. Coven
Assistant Examiner—Max F. Hindenburg
Attorney, Agent, or Firm—Brumbaugh, Graves, Donohue & Raymond

[57] ABSTRACT

An electronic thermometer includes a color coded probe permanently fastened by an electrical cable to a color coded isolation chamber to prevent inadvertent use of a rectal probe with an oral isolation chamber. Red and blue isolation chambers used for oral and rectal temperatures, respectively, can readily be used with one thermometer housing. A connector between the isolation chamber and the housing automatically connects and disconnects the probe and the thermometer circuits when the isolation chamber is inserted into or removed from the housing. Moreover, insertion of the probe into the isolation chamber automatically actuates a switch in the electronic thermometer housing to deactivate the electric circuits. Withdrawal of the probe from the chamber automatically supplies power to the thermometer circuits to ready the thermometer for operation.

6 Claims, 4 Drawing Figures

ELECTRONIC THERMOMETER WITH PROBE ISOLATION CHAMBER

BACKGROUND OF THE INVENTION

In recent years electronic thermometers, which provide rapid and accurate readings of body temperature, have supplanted mercury thermometers in hospitals and the like. Such electronic thermometers ordinarily use a probe at the end of which is located a temperature-sensitive element, for example a thermistor. After a sterile disposable plastic cover is placed on the probe, it may be inserted into a body orifice.

In presently used instruments, the probe is detachably coupled to an isolation chamber by a cable and connector. With this arrangement, an operator can readily disconnect a probe from one chamber and connect it to another isolation chamber, thereby increasing the possibility that a rectal probe may be inserted into an oral isolation chamber, or vice versa, an undesired procedure. Because it is necessary to use two different electronic thermometers for taking oral and rectal temperatures, the inappropriate practice of switching probes and using an oral probe with a rectal isolation chamber was inadvertently encouraged.

Moreover, some prior thermometers used an external switch on the isolation chamber or housing, a distraction and a disadvantageous arrangement since the units often are left energized resulting in unnecessary battery use.

SUMMARY OF THE INVENTION

The present invention provides an electronic thermometer usable with oral and rectal probes permanently attached to oral and rectal isolation chambers, thus precluding inadvertent use of a probe with the wrong isolation chamber, an unsanitary procedure.

More particularly, in the inventive electronic thermometer, a color coded probe is permanently fastened by an electrical cable to a color coded isolation chamber. Red and blue isolation chambers are used for oral and rectal temperatures, respectively, universal hospital color codes. If it becomes necessary to take an oral temperature and the nurse finds the only convenient electronic thermometer has a blue isolation chamber and probe, and there is not another entire unit available, it is only necessary to substitute a red isolation chamber and attached probe. A connector between the isolation chamber and the housing automatically connects and disconnects the probe and the thermometer circuits when the isolation chamber is inserted into or removed from the housing.

Another feature of the invention includes the elimination of an external switch. More particularly, insertion of the probe into the isolation chamber actuates a switch in the electronic thermometer housing to deactivate the circuits. Upon withdrawal of the probe from the isolation chamber, the switch is closed automatically to supply power to the circuits and ready the thermometer for operation.

These and further features and advantages of the invention will be more readily understood when the following description is read in connection with the accompanying drawings.

DESCRIPTION OF EXEMPLARY EMBODIMENTS

Figures 1, 2:
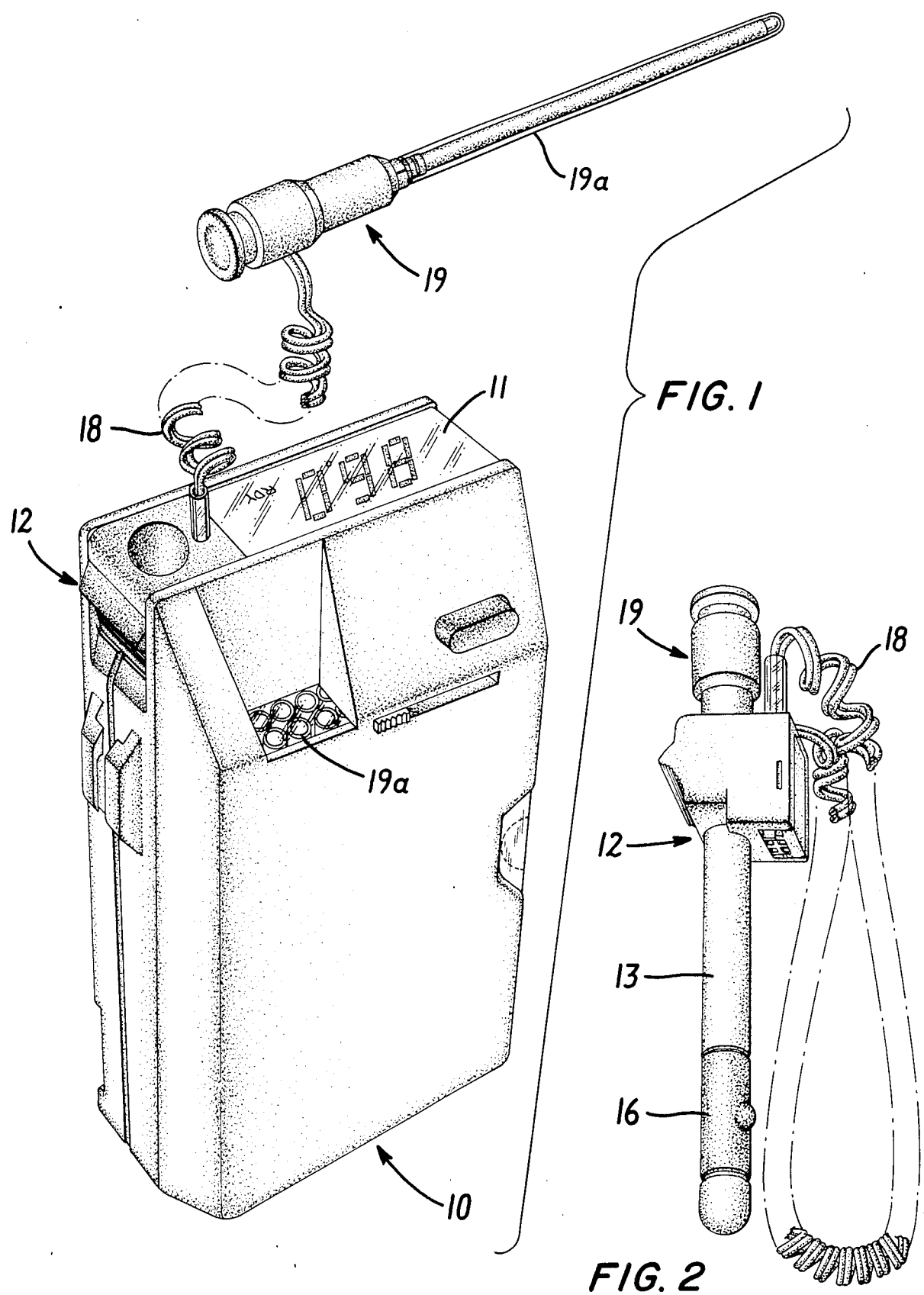
FIG. 1 is a view in perspective of the inventive electronic thermometer with a probe out of an isolation chamber.
FIG. 2 is a perspective of the isolation chamber removed from the thermometer housing with the probe in the chamber.
Figure 3:
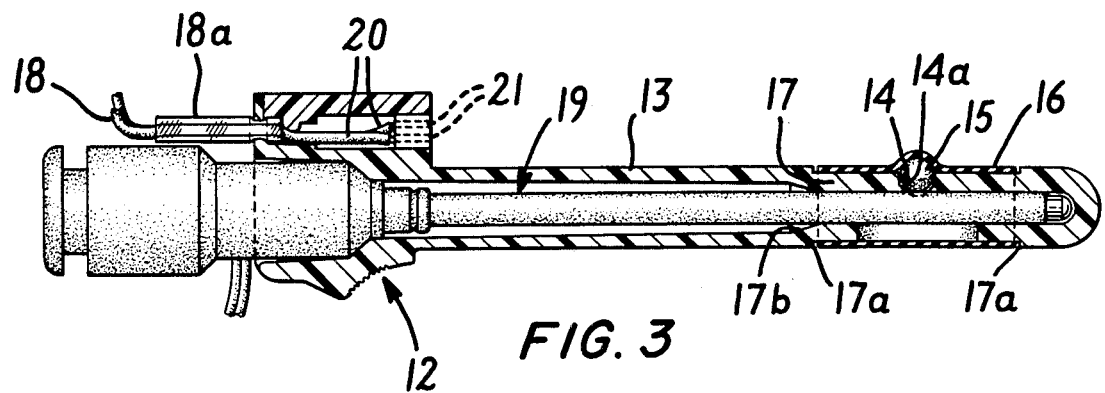
FIG. 3 is a cross-section of the isolation chamber with the probe in stored position showing a switch actuating device operated by insertion of the probe into the chamber.

Referring to the drawings with particular reference to FIG. 1, a housing 10 containing the electrical components of the electronic thermometer is provided at its upper end with a display panel 11 to read out body temperature. A color coded isolation chamber 12 (FIG. 2) fits into a compartment 10a (FIG. 4) at one side of the housing 10. A coiled cable 18, also color coded, extends from a reinforcing bushing 18a fastened in the isolation chamber 12 to a color coded probe 19 and connects via conductors 20 to receptacle contacts 21 (FIG. 3).

When the probe 19 is withdrawn from the isolation chamber 12, its tip is inserted into an elongated cover 19a held in a box located in the housing 10. For hygienic purposes, the probe 19 with the cover 19a is of too great a diameter to be inserted fully into the isolation chamber 12.

Figure 4:
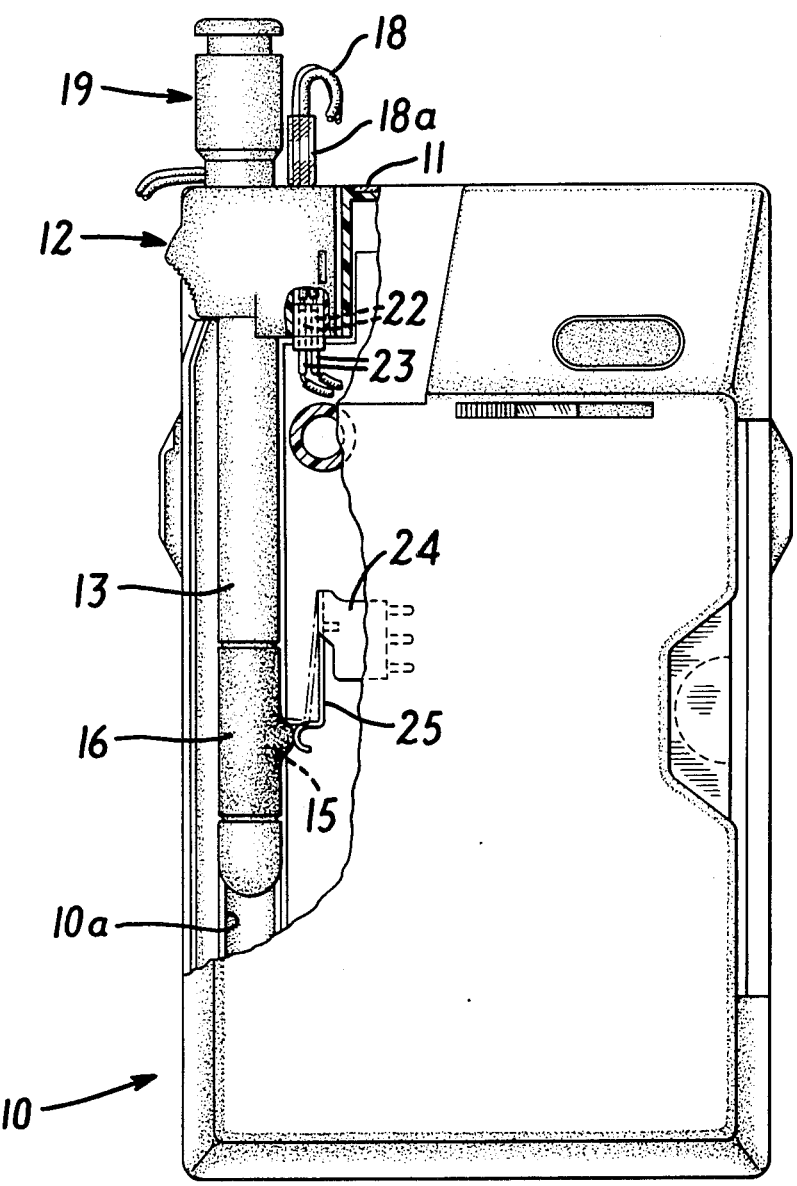
FIG. 4 is a view of the housing of the electronic thermometer, partially broken away, showing a switch operated by insertion of the probe into the isolation chamber, and the electrical connection of the probe to the thermometer circuits in the housing.

The isolation chamber 12 is shown in FIGS. 2 and 4 with the probe 19 fully inserted and in its normal inoperative position. The connector receptacles 21 are adapted to receive pins 22 (FIG. 4) to connect the probe 19 electrically to conductors 23 leading to circuits in the electronic thermometer. More particularly, a temperature sensitive element, for example a thermistor, in the tip of the probe 19, is connected electrically to conductors 23 by the cable 18 and the receptacles 21 and pins 22.

A switch 24 in the housing 10, for example a microswitch as shown in FIG. 4, includes an operating arm 25. When in its operated position, as shown in solid line in FIG. 4, the switch interrupts the circuits in the electronic thermometer to render it inoperative. When the arm 25 is in its broken line position, the switch 24 is closed to energize the electronic thermometer.

Included in the isolation chamber 12 is a tube 13, forming an elongated chamber for the probe 19. A cylindrical opening 14 provided in the tube 13 is formed with an annular shoulder 14a at its inner edge. A ball 15 is retained in the opening 14 by an elastic sleeve 16 stretched around a reduced diameter section 17 of the tube 13. Note that both the external and internal diameters of the section 17 are reduced. External shoulders 17a hold the sleeve in place and internal tapered shoulders 17b guide the tip of the probe 19 through the section 17. With the probe 19 fitting closely within the cylindrical opening in the section 17, insertion of the probe forces the ball 15 outwardly against the elastic sleeve, as shown in FIG. 3.

Referring again to FIG. 4, the ball 15 engages the switch operating arm 25 through the elastic sleeve 16. With the probe 19 resting in the isolation chamber 12, the switch is operated and the electrical thermometer circuits interrupted. Upon withdrawal of the probe 19 from the isolation chamber 12 to take a patient's temperature, the switch arm 25, which is biased to move outwardly upon movement of the ball 15, follows the ball and actuates the switch, thereby energizing the electronic thermometer. As shown in FIG. 1, the number 86 and the legend RDY appear on the display panel indicating that the instrument is ready for use.

Each isolation chamber 12, cable 18 and probe 19 is color coded red for oral use and blue for rectal use. Since the probe is permanently connected to the isolation chamber by the cable, it is impossible to use a rectal probe with an oral isolation chamber or vice versa. In other words, the inventive arrangement obliges the operator of the thermometer to change the isolation chamber from blue to red if oral temperature is desired and a blue unit is found in the thermometer.

Also advantageous is the provision of the on-off thermometer switch 24 in the housing to energize and deenergize the thermometer automatically upon its use and upon subsequent probe storage. Such operation frees the doctor or nurse from concern about properly manipulating switches, a distraction avoided by the inventive thermometer. It also prevents unnecessary battery drain if inadvertently an external switch is not operated to its off position.

While the invention has been shown and described with reference to the illustrated embodiments, it should be understood that various changes in form and details may be made without departing from the scope of the invention which is defined in the appended claims.

We claim:

1. An electronic thermometer comprising a housing containing electrical circuits for the thermometer, a probe including a temperature sensitive element for insertion into a body orifice, an isolation chamber for storing the probe, an electric cable connected to the temperature sensitive element and permanently connecting the probe to the chamber, conductor means connecting the cable to a connector on the isolation chamber, a compartment in the housing adapted to slidably receive the isolation chamber, a connector in the compartment for electrically receiving the chamber connector for coupling the probe electric cable to components in the housing when the isolation chamber is positioned in the compartment, a switch including an operating member in the housing connected to electrical circuits in the housing, a switch actuating device in a wall of the compartment, said switch actuating device including an actuator movable between first and second positions, the probe when inserted and withdrawn from the compartment of the isolation chamber engaging the actuator to move it between the first and second positions for moving the operating member to operate the switch.

2. An electronic thermometer as defined in claim 1, wherein the isolation chamber and probe are color coded to indicate a body orifice into which the probe should be inserted.

3. An electronic thermometer as defined in claim 1, in which the actuator comprises a ball held in an opening in the compartment by an elastic sleeve and by retaining means at the inner end of the opening, the probe when inserted in the isolation chamber compartment engaging the ball to move it outwardly for moving the operating member to operate the switch.

4. An electronic thermometer comprising a housing containing electrical circuits for the thermometer, a probe including a temperature sensitive element for insertion into a body orifice, an isolation chamber for storing the probe, an electric cable connected to the temperature sensitive element and permanently connecting the probe to the chamber, conductor means connecting the cable to a plug-in connector on the isolation chamber, a compartment in the housing adapted to slidably receive the isolation chamber, a plug-in connector in the compartment for electrically receiving the plug-in connector on the isolation chamber for coupling the probe electric cable to components in the housing when the isolation chamber is positioned in the compartment, a switch in the housing connected to electrical circuits in the housing, an operating arm extending from the switch and juxtaposed to the isolation chamber when it is located in its housing compartment, a cylindrical section in the chamber closely fitting the probe, an opening in the cylindrical section, a ball held in the opening by an elastic sleeve on the section and by retaining means at the inner end of the opening, the probe when inserted in the cylindrical section engaging the ball to move it outwardly for operating the arm and actuating the switch.

5. An electronic thermometer as defined in claim 4, wherein the isolation chamber and probe are color coded to indicate a body orifice into which the probe should be inserted.

6. An electronic thermometer as defined in claim 4, in which a probe cover located in the housing is adapted to be placed over the probe, and the isolation chamber section being sized to prevent entry of the probe when carrying the probe cover.

* * * * *